United States Patent [19]

McGill et al.

[11] 4,360,101

[45] Nov. 23, 1982

[54] CASE FEED CONTROL FOR ARTICLE HANDLING APPARATUS

[75] Inventors: Robert W. McGill, Munroe Falls; Michael E. Winiasz, Lorain, both of Ohio

[73] Assignee: A-T-O Inc., Willoughby, Ohio

[21] Appl. No.: 879,129

[22] Filed: Feb. 21, 1978

[51] Int. Cl.$^3$ ............................................. B65G 47/31
[52] U.S. Cl. .................................... 198/461; 198/576
[58] Field of Search ............... 198/461, 462, 459, 480, 198/481, 491, 534, 576

[56] References Cited

U.S. PATENT DOCUMENTS

| | | | |
|---|---|---|---|
| 1,900,657 | 3/1933 | Newhouse | 198/733 X |
| 2,977,276 | 3/1961 | Colliva | 198/459 X |
| 3,031,061 | 4/1962 | Rambo et al. | 198/459 |
| 3,589,497 | 6/1971 | Leach | 198/459 |

*Primary Examiner*—Robert B. Reeves
*Assistant Examiner*—Douglas D. Watts
*Attorney, Agent, or Firm*—Oldham, Oldham, Hudak & Weber & Co.

[57] ABSTRACT

An article casing or uncasing apparatus having a conveyor for moving cases through a fixed course wherein a driven case supply conveyor deposits cases onto a driven supply conveyor that has an axially extending opening therein, a driven star wheel positioned in such axial opening parallel to the longitudinal axis of the same and having teeth that protrude upwardly from the case supply conveyor as the star wheel is rotated, the supply conveyor and star wheel being driven in the same direction at upper portions thereof but with the supply conveyor being driven at a faster linear speed than the star wheel or the case supply conveyor to urge the leading end of input cases into engagement with a tooth of the star wheel which retards downstream movement of the case for timed release of a case by continuing drive of the conveyor and star wheel for controlled downstream delivery of individual cases in the apparatus for further processing therein. The cases are individually deposited onto a case transport conveyor and are spaced longitudinally from each other on such conveyor by timed release by the star wheel.

10 Claims, 7 Drawing Figures

CASE FEED CONTROL FOR ARTICLE HANDLING APPARATUS

BACKGROUND OF INVENTION

Heretofore there have been various types of case processing apparatus provided both for article unloading or uncasing actions and for depositing articles into the cases. In these actions, obviously it is very desirable to have the apparatus function automatically, safely and as rapidly as possible. One problem continually encountered in all case and article processing systems or devices is that of accurately correlating the case input speed or movement to the drive speed and functioning actions of other portions of the apparatus.

Typical prior art patents on article or bottle uncasing apparatus include the structures disclosed in prior U.S. Pat. Nos. 2,783,869 and 3,951,285.

As previously indicated, various control actions and apparatus have been proposed heretofore to improve the speed and operation of article casing and uncasing devices, but yet it is continually necessary to improve the speed of operation of the article processing apparatus, and to improve the speed of operation of the article processing apparatus, and to improve the control functions and adjustability of the apparatus.

It is our understanding that some type of folded cardboard box feed apparatus has been provided heretofore that individually released the box blanks, as for movement to an indexing or stacking station without fully stopping an incoming flow of a stream of box blanks.

OBJECTS OF THE INVENTION

The general object of the present invention is to provide a novel and improved case feeder apparatus and method characterized by the timed release of cases individually onto a case transport conveyor from a plurality of abutted cases being continuously moved into the apparatus without any complete stoppage of the flow of incoming cases to the apparatus.

Another object of the invention is to provide a driven star wheel positioned within the operative confines of an endless case supply conveyor wherein teeth on the star wheel protrude up beyond the fixed course of the conveyor for engaging cases being moved thereby and controlling the time of release of the case, the star wheel being driven at a slower peripheral speed than the peripheral speed of the case supply conveyor.

Other objects of the invention are to provide new and improved case engaging means and case transport conveyor combination in an article handling apparatus; to provide a mechanical, positive functioning case input control means in article uncasing apparatus; to provide a new method of control of feed of cases in timed relation to apparatus operation; to use speed differentials in case controls for case separation; to conveniently control the speed of case processing or movement actions in article casing and uncasing apparatus in relation to the drive of article handling portions of the apparatus; and to provide an improved, compact mechanical apparatus for controlling the flow of cases fed into the article processing apparatus for moving articles into or from the cases.

The foregoing and other objects and advantages of the present invention will be made more apparent as the specification proceeds.

Reference now is particularly directed to the accompanying drawings, wherein.

When referring to corresponding members shown in the drawings and referred to in the specification, corresponding numerals are used to facilitate comparison therebetween.

SUBJECT MATTER OF INVENTION

This invention relates to article casing and/or uncasing apparatus including a frame means, an endless driven article engaging and transfer conveyor moving around a fixed course lying in and defining a vertical plane, and a driven endless case transport conveyor for engaging cases and moving them along a fixed upper course under a portion of the course of said transfer conveyor for article movement therebetween. The invention relates to the improvement comprising the case transport conveyor having a horizontal upper course, a driven endless case supply means, a driven case supply conveyor that has an axially extending opening intermediate its lateral margins, and a driven star wheel with teeth individually positioned above the surface of the conveyor device on wheel rotation, the star wheel being parallel to the longitudinal axis of the case supply conveyor and being positioned in the supply conveyor opening, and wherein the case supply means, the supply conveyor and star wheel all are driven in the same direction at upper portions thereof, but with the supply conveyor being driven at a faster linear speed than the star wheel or case supply means to urge the leading end of each case into engagement with a tooth of the star wheel for retarding downstream movement of the case as it is moved through the apparatus for deposit onto the endless case transport conveyor that is downstream of the star wheel and the case supply conveyor to receive cases therefrom for further processing in the apparatus.

Figure 1:
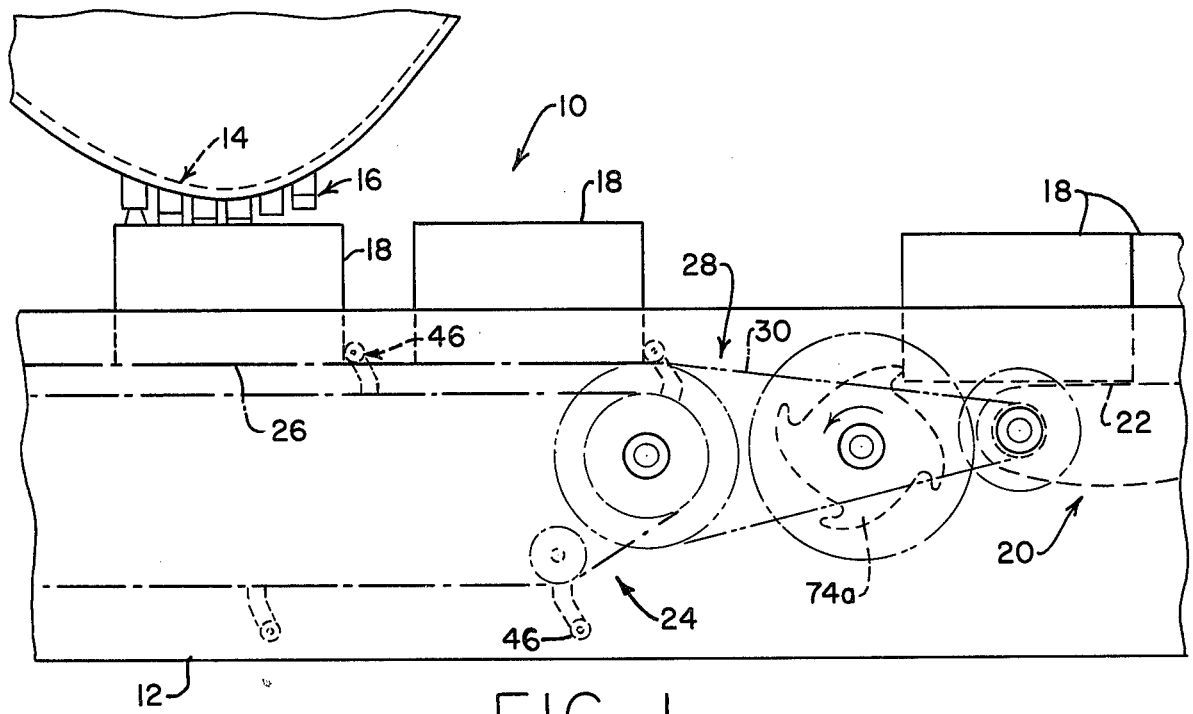
FIG. 1 is an elevation, partially diagrammatic, of article processing apparatus embodying the principles of the invention.

Reference now is directed to the details of the structures shown in the accompanying drawings, and a portion of an article handling apparatus is indicated somewhat diagrammatically in FIG. 1 and is referred to by the numeral 10. This apparatus includes a frame means 12 on which is positioned by means (not shown) an endless driven article engaging and transfer conveyor 14 that is suitably mounted for movement around a fixed course that lies in and defines a vertical plane. Such conveyor 14 has a plurality of article gripper devices 16 supported thereby and controlled by and movable with the conveyor 14. These article grippers may be of any conventional type and one example of which is shown in co-pending U.S. patent application Ser. No. 845,460. Such a conveyor 14 and the article grippers 16 are particularly adapted to deposit articles, normally bottles, into cases moved along underneath the conveyor 14, or else the apparatus can be used for unloading articles from the cases as desired. It will be considered for disclosure in the present application that the apparatus is used for removing bottles from a plurality of aligned and abutted cases 18 being fed into the apparatus 10 for processing therein and movement therethrough. These cases 18 are of any conventional construction and are suitably supplied to and normally moved along a driven case supply or feed means 20 that usually comprises some type of a suitable support or feed conveyor 22.

The subject matter of the present invention especially relates to the means and apparatus for controlled movement of the cases 18, individually, from the conveyor 22 to deposit these cases in timed relationship to each other onto a case transport conveyor 24 for longitudinally spaced movement therealong. Such transport conveyor is driven through a fixed path including a horizontal upper course indicated at 26 and which upper course is positioned below the conveyor 14 but in the plane thereof. The conveyor positions the cases 18 for removal of articles from the cases by the article grippers 16.

Delivery of the cases 18 from the input conveyor 22 to the transport conveyor 24 is effected primarily by a supply conveyor means 28 which includes an upwardly inclined upper course 30 and which preferably comprises a plurality, such as three, chains 32a, 32b and 32c positioned in laterally spaced relationship on the apparatus by conventional means such as sets of sprockets 34 and 36. These sprockets 34 and 36 individually engage opposite ends of the individual endless conveyor chains and secure them to individual drive or support shafts 36 and 40 with the shaft 38 being positioned at the upstream end of the chains and the shaft 40 then naturally being at the downstream end of the chains so that they are positioned to provide a conveyor means that has one or more longitudinally extending openings therein intermediate the lateral margins of the conveyor. Such supply conveyor 28, as indicated best in FIGS. 1 and 2 of the drawings, preferably has its upstream end overlapping the feed conveyor 22 that usually is supported on the same shaft 38 as the upstream end of the supply conveyor 28 to receive cases therefrom. The feed conveyor 22 may be of any known construction and several laterally spaced cross plate type conveyors are preferred so that the chain conveyors can overlap and be below the upper reach of the conveyors 22 (FIG. 2) on the shaft 38.

Figure 3:
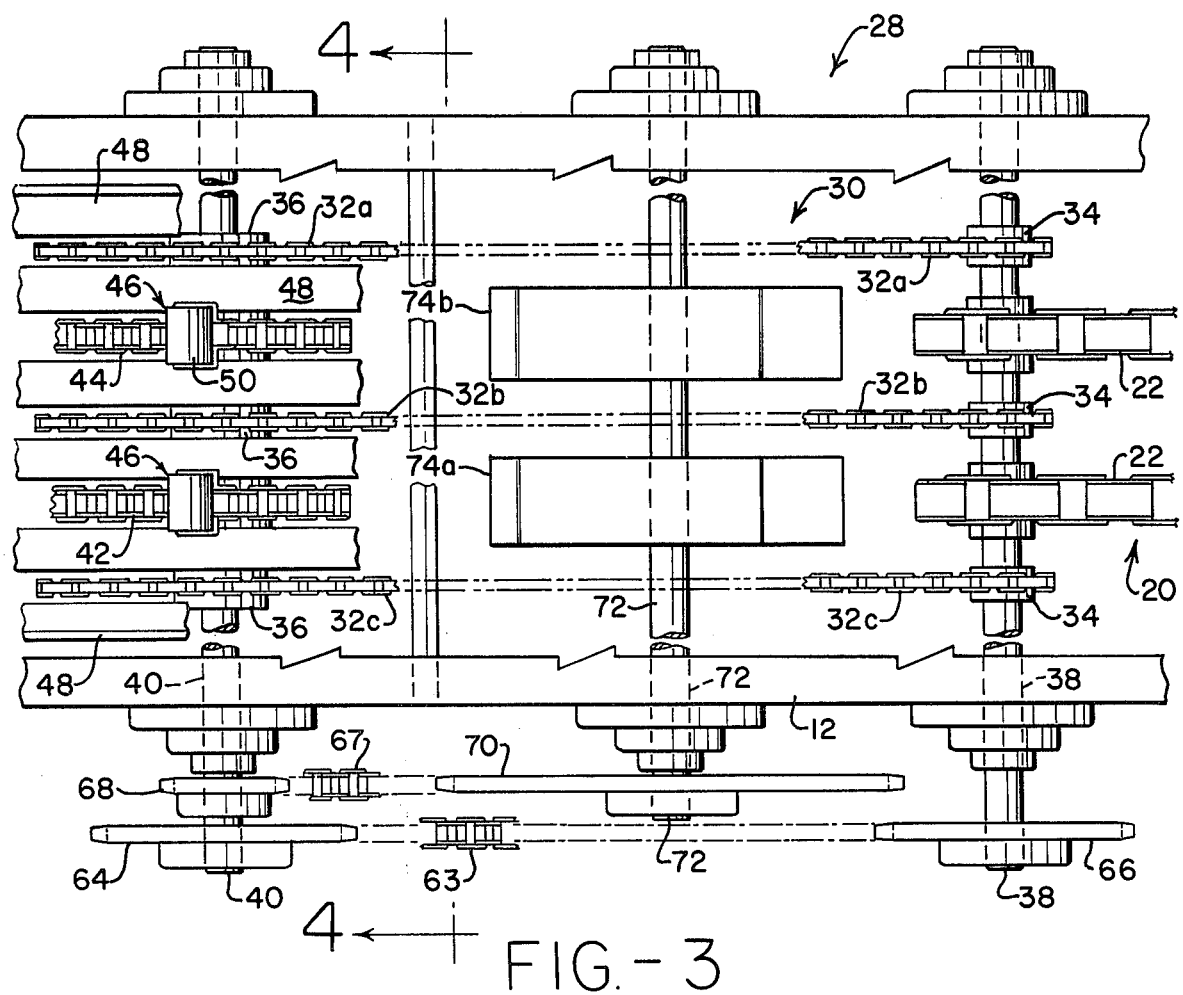
FIG. 3 is a top plan view of the apparatus of FIG. 2.
Figure 5:
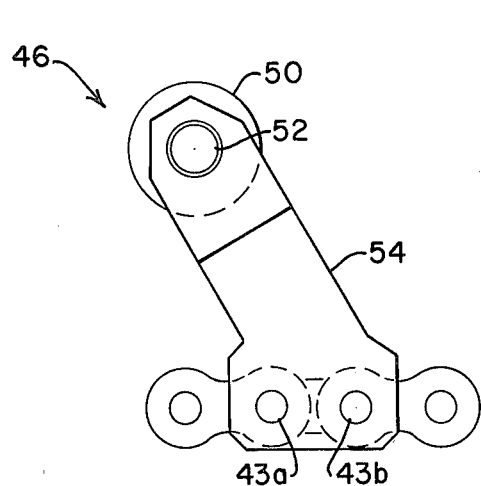
FIG. 5 is a fragmentary enlarged side elevation of a case engaging member on the delivery conveyor of the apparatus.
Figure 6:
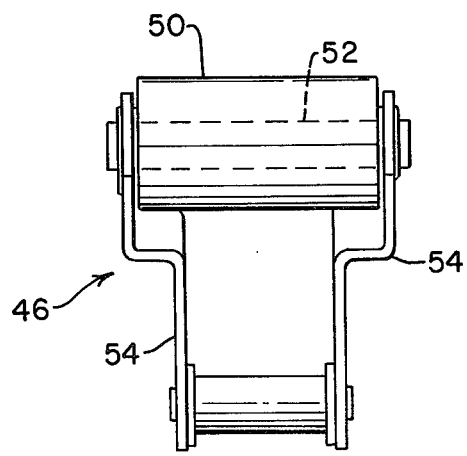
FIG. 6 is a right side elevation of the member of FIG. 5.
Figure 4:
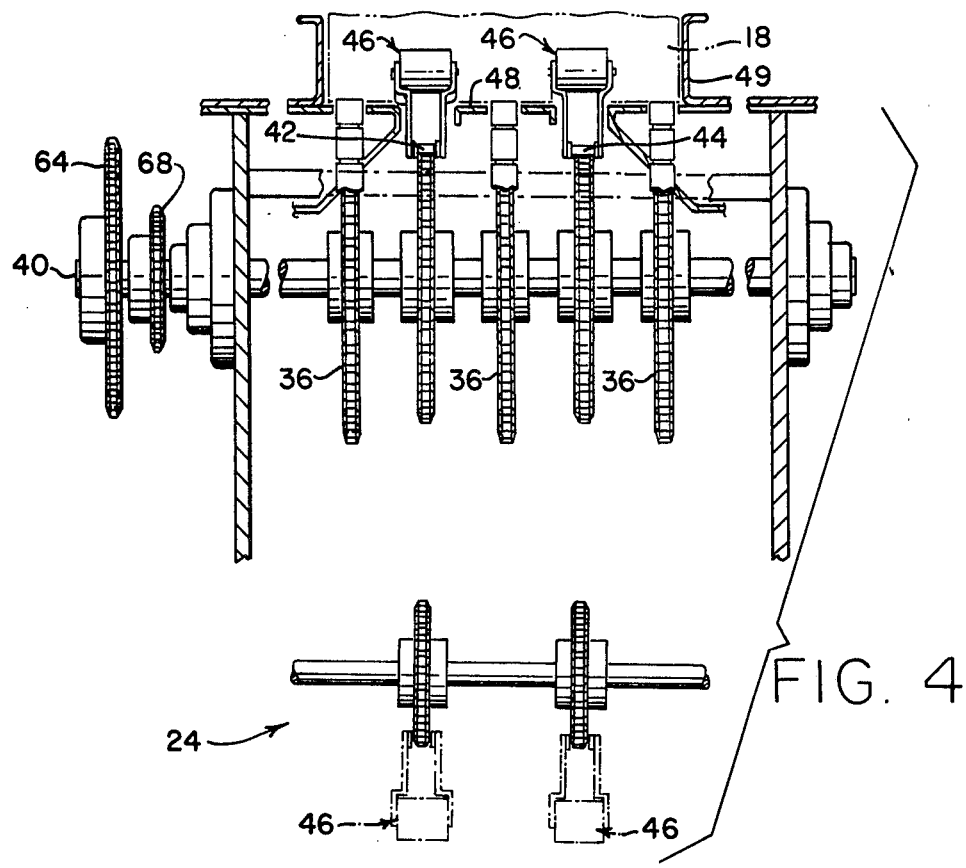
FIG. 4 is an end elevation of the apparatus of FIG. 3 taken on line 4—4 thereof with some parts removed.

The case transport conveyor 24, as best shown in FIGS. 3 and 4, comprises two individual endless chains 42 and 44 positioned in parallel and with each chain positioning a plurality of case engaging means 46 thereon in equivalent longitudinally spaced positions to be laterally aligned in the apparatus, as shown in FIG. 3. These case engaging members engage the upstream end of the individual cases as supplied to this transport conveyor and control the case movement through the final portion of the apparatus for article receipt or removal action therein. Usually the apparatus also has a plurality of guide or support plates 48 positioned intermediate the chains 42 and 44 and on the sides thereof for slidably supporting the individual cases as they are propelled along the horizontal upper course 26 of the transport conveyor 24 and are guided therealong by suitable adjustable edge guides 49.

These case engaging members 46 preferably comprise rollers 50 supported on a shaft 52 that is suitably operably engaged with a pair of support arms 54 engaging with a pair of adjacent roller pins 43a, 43b in one of the roller chains 42 and 44. By this construction, some arcuate flexibility of the rollers 50 is provided since no matter how tightly stretched the chains 42 and 44 would be in the apparatus, still some very desirable resiliency of the arms 54 to the normal longitudinal axis of the conveyor (or chains 42 and 44) is provided for the rollers 50 and their supports as the rollers engage a case for movement through the apparatus.

It should be noted that the supply conveyor 28 has its upper course 30 inclined upwardly of the apparatus and such upper course terminates in axially overlapping relationship with the upstream end of the transport conveyor 24 but with the roller chains 42 and 44 having portions that are effectively horizontally aligned with the downstream end of the upper course 30 of the chains 32a, 32b and 32c provided in the apparatus to receive cases readily therefrom.

APPARATUS DRIVE MEANS

In order to control the case movement through the apparatus in correlation with the drive of the article engaging and transfer conveyor 14, the apparatus of the invention preferably has a unitary drive system. Such drive system (not shown) may comprise a conventional drive member or system engaging the downstream end of the case transport conveyor 24 (not shown) and pull the upper course 26 of the same at a desired speed through its fixed course. The drive system also engages and drives the conveyor 14. The upstream end of the conveyor 24 is supported on suitable sprockets 60 that engage the chain conveyors 42 and 44 and are fixed to the support shaft 40 that extends transversely of the frame means. Hence, the transport conveyor 24, shaft 40, and conveyor 14 are driven at correlated speeds.

Power is transmitted from this shaft 40 to the shaft 38 by means of a drive chain 63 engaging equal size sprockets 64 and 66 received on and secured to such individual shafts 40, 38 to drive the shaft 38 and the feed conveyor 20 at a speed correlated to, or usually the same as, the drive of the remainder of the apparatus. This will control input of cases from the feed conveyor 22 to the apparatus.

Drive through this shaft 40 is also taken by means of a drive chain 67 engaging a relatively small sprocket 68 secured to the shaft 40 and extending to and engaging a relatively large diameter sprocket 70 secured to a shaft 72. The shaft 72 is positioned on the frame 12 intermediate the upstream and downstream ends of the supply conveyor 28 and also intermediate the upper and lower courses of the same. Such shaft 72 has one or more, usually two, star wheels 74a and 74b, positioned thereon in laterally spaced relation and located intermediate the chains 32a, 32b and 32c as indicated in FIGS. 3 and 4 of the drawings. These star wheels have a plurality of relatively elongate radially extending teeth 76 thereon and wherein the leading edge of each tooth 76, indicated at 76a, has a smoothly curved radially outwardly extending leading edge (76a connecting the root of an adjacent tooth to the following tooth. A concave edge 76b is provided on the trailing edge of each of the teeth 76 to form a rearwardly or downstream facing tooth end 76c on each tooth for a purpose to be described hereinafter in more detail.

Figure 2:
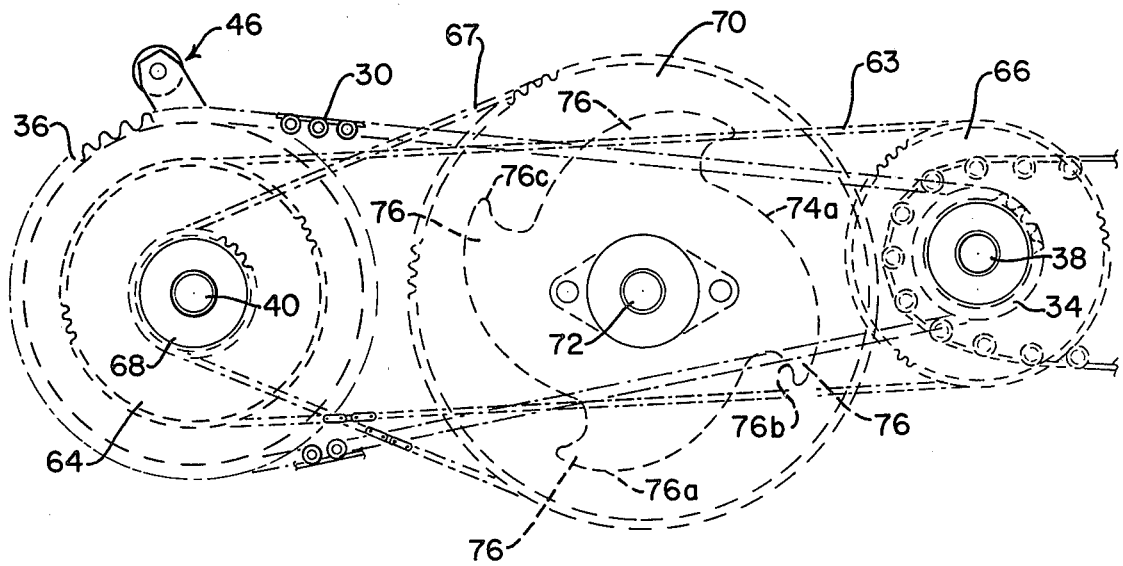
FIG. 2 is an enlarged, fragmentary side elevation of the case processing and control apparatus of the invention.
Figure 7:
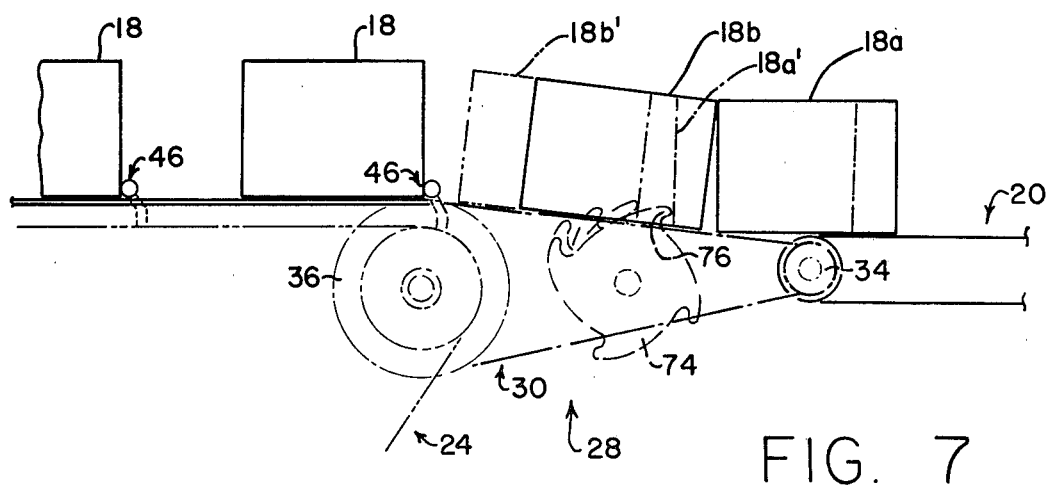
FIG. 7 is a diagrammatic showing of cases moving along in the apparatus.

The star wheels 74 are positioned, as indicated in FIG. 2, in such a manner that as these wheels are driven, the individual teeth 76 are moved above the upper course 30 of the supply conveyor 28 and this will provide a lifting action on the trailing ends of the individual cases being processed, as indicated in FIG. 7, as they move over and past the star wheels. The movement of the individual cases onto and over the star wheel 74 is obtained because the case supply conveyor 30 is driven at an appreciably greater linear speed than the peripheral rotational speed of the star wheels 74. Hence, as the leading end of a case 18a, FIG. 7, moves from the feed conveyor 20 onto the supply conveyor 28, the case will start to be accelerated unless it is prevented from moving forwardly by a preceding case or other member. The case 18a is so timed in its movement and control by the preceding case 18b and the drive action of the control conveyors, that the leading lower corner edge of the case 18a is exposed and is engaged by the tooth 76 of the star wheel means, as indicated at 18a', as the case 18b advances on the supply conveyor as permitted by the star wheel rotational speed and as the trailing end of the case 18b is lifted by a tooth of the star wheel. At that time, the leading end of the case 18b is supported on the supply conveyor 30 and the case is advancing downstream more rapidly than the star wheel periphery and the case is advancing to position 18b' so that a spacing or gap is provided between the initially abutted cases 18b and 18a.

The engagement of the tooth 76 of the star wheel or of a plurality of aligned teeth of star wheels with the following case 18a, as shown in FIG. 7, is facilitated by the vertical lifting action on the trailing end of the preceding case 18b and this provides a mechanical exposure of the leading lower front corner of the following case for mechanical engagement of the same by the star wheel tooth. Hence, such following case is permitted to move downstream only at the speed of the star wheel periphery, and all of the input feed cases are continually moving as they are not stopped by the controlled release of the cases individually. The tooth 76 retarding one of the cases from downstream movement is designed and controlled to rotate and be moved to a position below the upper course 30 of the supply conveyor means at which time the full length of the case may be supported on the supply conveyor means and the case then advances rapidly at such increased speed as provided by this conveyor 28 in relation to the peripheral speed of the star wheel. Or, the case end may have previously been moved onto the conveyor 24 as it is advanced from the position indicated in FIG. 7. This case release is in timed relation to the other operations of the apparatus to deposit a case on the conveyor 24 for prompt engagement by the pushers 46.

The conveyor course 30 extends upwardly at a slight angle and its upstream end is slightly vertically below the discharge level of the supply means 20. It will be appreciated that the machine as designed can be set up with proper correlated speeds for the periphery of the star wheel in relation to the downstream flow of the cases as provided by the feed conveyor 20, the supply conveyor 28 and the transport conveyor 24. But, if any adjustment in these relative speeds is desired, then the sprocket 70 or sprocket 68 could be changed in diameter and, if desired, or if necessary, the drive connection between the shafts 40 and 38 could be varied. However, normally such shafts 38 and 40 and the associated conveyors are driven at the same speed by use of identical drive sprockets 64 and 66 carried on the respective shafts.

It should also be realized that the present invention relates to the method of controlling timed release of individual cases in case processing apparatus wherein articles can be deposited into the cases or be withdrawn therefrom, as desired. In all events, it is necessary to provide a stream of longitudinally abutted cases moving through a fixed course, and the invention contemplates retarding the downstream movement of the leading case after it has been associated with an increased speed supply conveyor means to be started to move faster than the remaining upstream cases. Then the apparatus also is designed to aid in providing correlated action between the leading case and the next following case to permit retention of such following case and additional following cases in the case infeed system whereby all of such cases are continually moving but with the leading case in all instances being engaged with the star wheel, being slightly temporarily retarded in the downstream movement, then being released and being speeded up to move it away from the following cases, and then to have the individual cases deposited upon a transport conveyor for timed movement along in association with other components of the apparatus for bottle or article deposit into the cases or withdrawal therefrom, as desired.

The apparatus and the method of the invention are achieved by use of easily controlled members designed to provide an operative service life with a minimum of maitenance. The apparatus is not complicated, but yet provides a positive, effective case control feed means for association and use with article and bottle processing apparatus of which the present invention normally is just a component.

Hence, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. Article uncasing and casing apparatus including a driven endless case feed means, a driven case supply conveyor means having an axial extending opening therein and an upper course for receiving cases from said case feed means and moving them downstream of the apparatus, and a driven endless case transport conveyor for engaging cases released by said case supply conveyor means and moving them along a fixed upper course for article processing action, the improvement comprising a driven star wheel positioned in said opening of said supply conveyor means parallel to a longitudinal axis of the same and rotating in a course to have each tooth project above the surface of said supply conveyor means for a portion of its path of movement; said case feeder means, supply conveyor means and star wheel all being driven in the same direction at upper portions or courses thereof, but with said supply conveyor means being driven at a faster linear speed than said star wheel or said case feed means to urge the leading end of input cases into engagement with a tooth of said star wheel to retard downstream flow thereof and control case release.

2. Article casing and uncasing apparatus as in claim 1, where said case supply conveyor means comprises a plurality as separate laterally spaced endless members, and said star wheel is positioned between a pair of adjacent endless members.

3. Article casing and uncasing apparatus as in claim 1, where said star wheel has teeth with different contours on the leading and trailing sides thereof to enable said star wheel to engage and retard the next case following the case having a downstream end then passing over said star wheel.

4. An article casing and/or uncasing apparatus, including a frame means, an endless driven article engaging and transfer conveyor moving around a fixed course lying in and defining a vertical plane and a driven endless case transport conveyor for engaging cases and moving them along a fixed upper course under a portion of the course of said transfer conveyor, the improvement comprising said case transport conveyor having a horizontal upper course, a driven endless case feed means, a driven case supply conveyor having an axially extending opening intermediate its lateral margins and an upper course for receiving cases from said feed means and moving them downstream of the apparatus, a driven star wheel positioned in said opening of said supply conveyor parallel to the longitudinal axis of the same but with the teeth on the star wheel on rotation being adapted to project above the surface of said supply conveyor; common driving means for said case transport conveyor, said case feed means, said supply conveyor and said star wheel; said case feed means, supply conveyor and star wheel all being driven in the same direction at upper portions or courses thereof but with said supply conveyor being driven at a faster linear speed than said star wheel or said case feed means to urge the leading end of an input case to move into engagement with a tooth of said star wheel to retard movement of a said case and release a case by said tooth moving below said upper course of said supply conveyor, said endless case transport conveyor being downstream of said star wheel and said case supply conveyor to receive cases therefrom.

5. In apparatus as in claim 4, where said star wheel has teeth with radially outwardly sloping leading edges that engage and lift the trailing end of a case engaging and being advanced by said supply conveyor, said star wheel teeth having undercut trailing edges shaped to engage a leading lower corner edge of a case as moved by said case supply conveyor.

6. In article casing and/or uncasing apparatus as in claim 4, where said endless case transport conveyor comprises an endless roller chain including a plurality of transversely extending pins, case engaging finger means, attaching devices pivotally securing said finger means to a pair of adjacent pins of said roller chain to extend outwardly of said roller chain, and where drive means engage said case transport conveyor at the downstream end of its fixed upper course to pull it along such course, said finger means extending upwardly from said roller chain, and roller means mounted on the upper end of said finger means, the upper end of said finger means being movable a short distance extending longitudinally of said fixed course, said roller chain normally being tensioned in its fixed upper course.

7. A method of controlling the feeding of cases for bottles and similar articles comprising moving a stream of longitudinally abutted cases along a fixed path to a control area, increasing the speed of movement of a leading case at the control area, raising the trailing end of the leading case at such control area, retarding the speed of movement of the case first following said leading case until the leading case is advanced and spaced from the following case and, initially retarding the speed of movement of said leading case at the control area without stopping such case and then releasing the leading case for increased speed movement.

8. Article casing and uncasing apparatus as in claim 1 where said star wheel is positioned intermediate the upstream and downstream ends of said supply conveyor means, and where said case supply conveyor means have an upper course inclined upwardly for downstream movement of cases, and where the teeth of said star wheel move through an operative path including a section extending above said upper course of said case supply conveyor means to facilitate case engaging action by said teeth.

9. Article casing and uncasing apparatus as in claim 1 where said star wheel is positioned intermediate the upstream and downstream ends of said supply conveyor means, and where said case supply conveyor means has an upper course inclined upwardly for downstream movement of cases, and where the teeth of said star wheel have undercut trailing edges which move through an operative path including a section extending above said upper course of said case supply conveyor means to facilitate case engaging action by said teeth, the upstream end of said upper course being below the level of support of cases by said case feed means at its downstream end.

10. A method of controlling the feeding of cases for bottles and similar articles comprising moving a stream of longitudinally abutted cases along a fixed path to a control area, increasing the speed of movement of a leading case at the control area, raising the trailing end of the leading case at such control area, retarding the speed of movement of the case first following said leading case until the leading case is advanced and spaced from the following case and, said cases having flat bottoms and flat ends extending perpendicularly to said flat bottoms so as to abut the trailing end of a leading case against the leading end of the following case, mechanically engaging and retarding the speed of movement of the case first following said leading case without stopping such following case until the leading case is advanced and spaced from the following case; and releasing the retarded cases individually in predetermined timed relationship to each other.

* * * * *